(No Model.)
T. & F. M. FIERCE.
HAY ELEVATOR AND CARRIER.
No. 250,431. Patented Dec. 6, 1881.
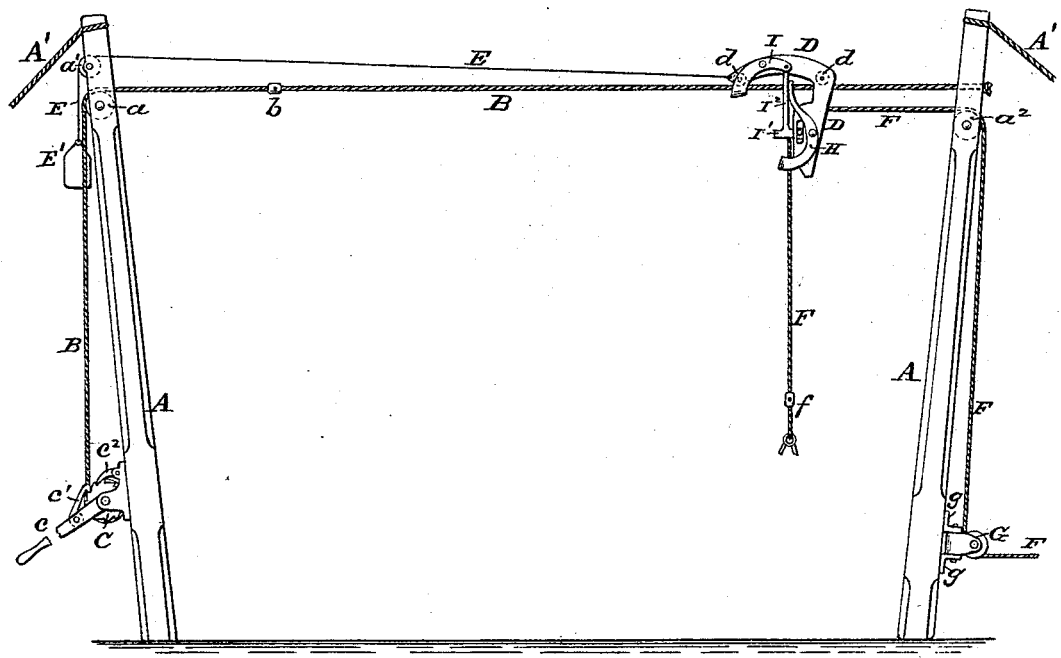
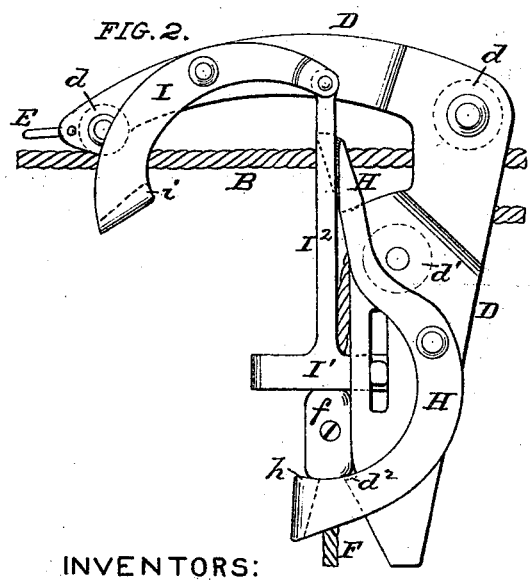
ATTEST:
A. J. O'Keefe
C. W. Bechler.
INVENTORS:
Thomas Fierce,
Francis M. Fierce
per Robert Burns, atty.

UNITED STATES PATENT OFFICE.

THOMAS FIERCE AND FRANCIS M. FIERCE, OF ST. LOUIS, MISSOURI, ASSIGNORS OF ONE-THIRD TO DUNCAN FRASER, OF EAST ST. LOUIS, ILLINOIS.

HAY ELEVATOR AND CARRIER.

SPECIFICATION forming part of Letters Patent No. 250,431, dated December 6, 1881.

Application filed September 5, 1881. (No model.)

*To all whom it may concern:*

Be it known that we, THOMAS FIERCE and FRANCIS M. FIERCE, citizens of the United States, and residents of the city of St. Louis, in the State of Missouri, have invented certain new and useful Improvements in Hay Elevators and Carriers, of which the following is a specification.

Our improvement relates to hay elevators and carriers in which the hay is elevated by a suitable hay hook or fork and carried to its destination by means of a carrier moving upon an elevated ropeway.

The objects of our improvements are to provide a cheap, positive, and effective construction of apparatus to perform the different latching and unlatching operations required in such apparatus, and we attain these objects by the mechanism illustrated in the accompanying drawings, in which—

Figure 1 is a side elevation, illustrating the general arrangement of parts. Fig. 2 is a detail side view of the carrier, with its latching, &c., mechanism. Fig. 3 is a sectional view of the same, the parts being shown in a different position to that of Fig. 2.

Similar letters of reference indicate like parts in the several views.

The masts A A are single and properly stayed by two or more ropes, A' A', as shown.

B is the track-rope, fixedly secured to one mast and passing over a friction-roller, $a$, in the other to a winding-drum, C, by which its slack is taken up after the masts are properly stayed in position. The drum C is preferably operated by a lever and pawl, $c$ $c'$, and locked in position by a dog, $c^2$, as clearly indicated in Fig. 1.

Upon the track-rope B is arranged to slide the carrier D, provided with track-rollers $d$ $d'$ and connected to the carrier-rope E, which passes over the roller $a'$ in the mast, and is provided with a weight, E', the tendency of which is to draw the carrier-frame D forward. The carrier is also provided with a roller, $d'$, over which passes the elevating-rope F, to the dependent end of which is attached the hay-fork or other suitable elevating device. The other end passes through the mast around a friction-roller, $a^2$, and down around a sheave, G, to be secured to the harness of the horse used to elevate the hay.

In order to enable the direction in which the horse is driven to be changed as may be found necessary, we have formed the housing of the sheave G with vertical pivots which turn in brackets $g$, secured to the mast, so that the sheave can be turned around in a horizontal direction to suit the direction in which it is desired to drive the horse.

The latching mechanism consists of a bifurcated curved lever, H, having at its lower end a lip or shoulder, $h$, which, when the hay-fork is raised, engages under the bead or ball $f$, attached to the rope F adjacent to the hay-fork, and, in conjunction with the lip $d^2$ of the carrier, locks the parts in their up position, as indicated in Fig. 2. The parts thus locked in an up position are (on the horse being backed) drawn forward by the weight and rope E E' until the ball or bead $b$ upon the track-rope B strikes the upper end of the lever H and pushes it back, so as to disengage its shoulder $h$ from under the bead $f$ and allow the load of hay to descend by gravity, this position of parts being clearly illustrated in Fig. 3.

The bead or ball $b$ is made adjustable on the rope-track B, so as to allow of the load being discharged at any desired point.

I is a pivoted bifurcated locking-lever, positioned as shown, and connected to sliding head I' by link I², and provided with an engaging-shoulder, $i$, which is cut away, as shown, so as to allow the bead or ball $b$ to readily pass through it as the carrier D is drawn forward, but which prevents its return unless it is independently operated, which independent movement is accomplished in the following manner: as the elevator-rope F is drawn up after having discharged its load of hay the bead or ball $f$ is drawn against the sliding head I', forcing it upward, and through the link I² rocks the lever I, so as to disengage the shoulder $i$ from engagement with the bead or ball $b$, and thus permit of the carrier D being drawn horizontally back to its original position, ready for to take another load of hay.

Having thus fully described our said invention, what we claim as new is—

1. In a hay elevator and carrier, the combination of the carrier-frame D, pivoted latching and unlatching lever H, rope-track B, provided with a bead, b, acting both as a stop for the carriage and an automatic releasing device for the fork, and elevating-rope F, provided with a bead, f, all constructed as herein described, and for the purpose set forth.

2. In a hay elevator and carrier, the combination of the carrier-frame D, pivoted latching and unlatching lever H, locking-lever I, sliding frame I', rope-track B, provided with bead b, and elevating-rope F, provided with bead f, all constructed and arranged as herein described, and for the purpose set forth.

In testimony of said invention witness our hands this 24th day of June, 1881.

THOMAS FIERCE.
FRANCIS M. FIERCE.

In presence of—
ROBERT BURNS,
C. W. BEEHLER.